Feb. 26, 1957  C. E. BOOKIDIS  2,782,754
CANDY-MAKING MACHINE
Filed Aug. 22, 1955
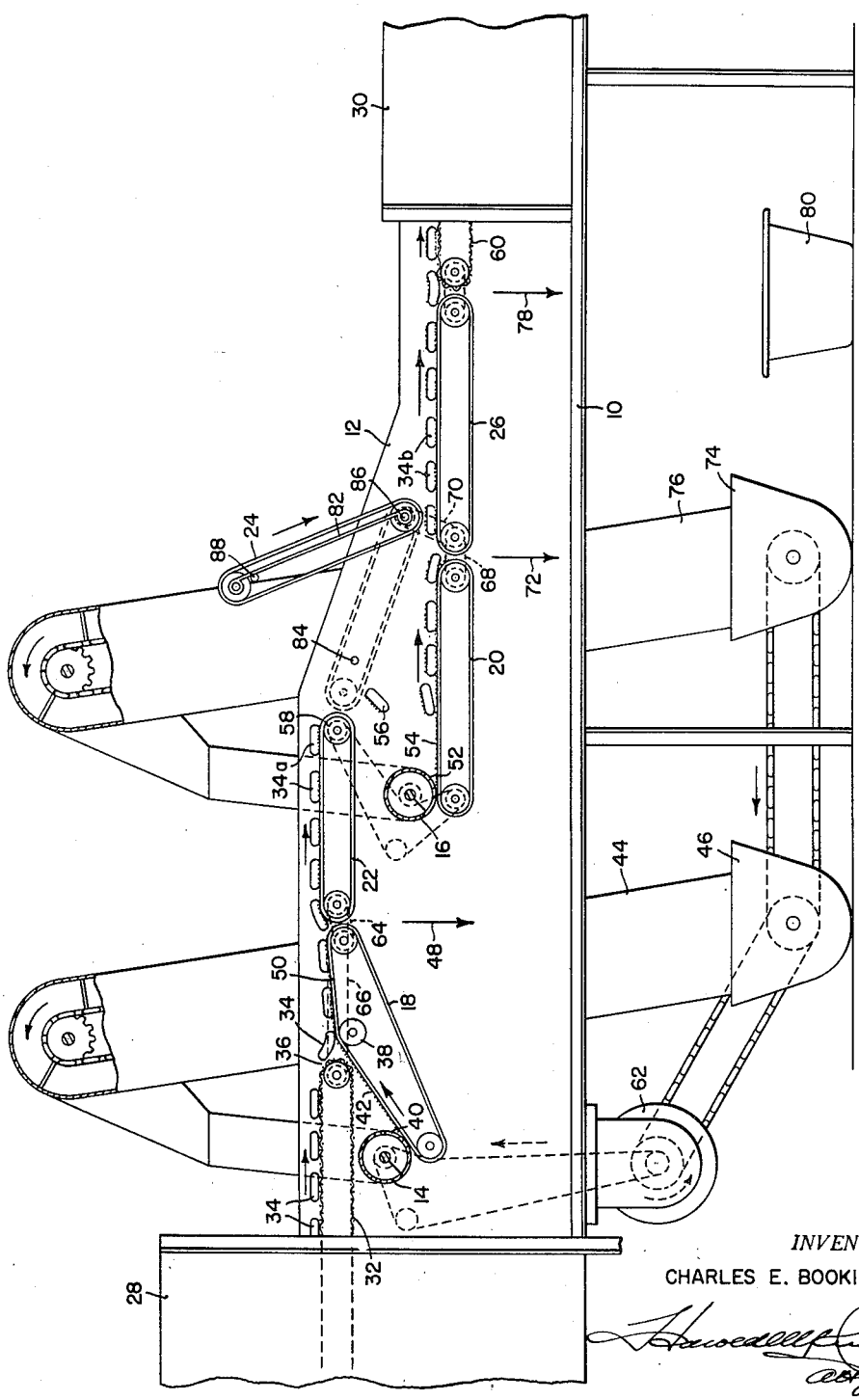
INVENTOR.
CHARLES E. BOOKIDIS United States Patent Office 2,782,754
Patented Feb. 26, 1957

2,782,754
CANDY-MAKING MACHINE
Charles E. Bookidis, Davenport, Iowa
Application August 22, 1955, Serial No. 529,650
1 Claim. (Cl. 118—13)

This invention relates to a machine for the manufacture of confections of the type comprising a tacky center, such as a nougat, for example, in the case of candy; and additive material, such as one or more kinds of nuts, adhered to or embedded in such center.

An important object of the invention is the provision of a system in which considerable selectivity is afforded in the way of the addition to the tacky center of one or more kinds of nuts to one or more sides of the center. A subsidiary object relates to bi-positionable means operative in one position to utilize the dual nut-applying feature of the invention and operative in another position to cause one nut-applying mechanism to be by-passed. A still further feature of the invention resides in handling means and material distributors arranged to cause the additive material to associate itself with the centers by causing the centers to press themselves by their own weight into a layer or layers of such additive material, thus avoiding the usual waste inherent in a system in which the additive material is merely dropped or sprinkled on the centers. The invention features still further means for retrieving additive materials and returning same to their respective sources of supply in the machine.

The foregoing and other important objects and desirable features inherent in and encompassed by the invention are achieved in what is now considered a preferred embodiment, as disclosed in the ensuing specification and accompanying sheet of drawing in which the single figure illustrates the inventive design somewhat schematically and partly in section.

Suitable framework 10 carries the several components of the apparatus and includes a pair of side walls 12, one of which is omitted to expose first and second distributors 14 and 16; first and second conveyors 18 and 20; a transfer means 22; by-pass means 24; and a final conveyor 26, all of which are arranged to transport the confection from a conventional enrober 28 to a tunnel 30. A typical wire-mesh conveyor 32 emerges from the enrober as a center-carrying means and carries tacky centers 34, such as nougats, for example, to a point of discharge at 36 onto the upper run of the first conveyor 18, which may be a canvas belt moving uphill because of an idler roll 38 so as to pass in close proximity to the discharge point 36.

The distributor 14 has an outlet 40 through which nuts of one particular type, as at 42, are discharged into the upper run of the conveyor 18 in layer fashion. Coconut, for example, may be the additive material furnished by the distributor 14, which is in turn supplied by an elevator or return means 44 which has a hopper 46 below the zone of transfer between the conveyor 18 and the transfer belt 22, so that nuts dropping from the belt or conveyor 18 may, as indicated by the arrow 48, drop into and be retrieved by the hopper 46 for return, as shown, to the distributor 14. As the tacky centers transfer from the wire conveyor 32 to the nut conveyor 18 at the point 36, they do so bottoms down and are supported by the layer of nuts 42 so that the nuts adhere to and become at least partly embedded in the centers. The distance that the layer-supported centers travel on the generally horizontal portion 50 of the conveyor 18 determines to some extent the nature of the adhesion of the nuts to the centers, to which must be added the distance traveled by the upper generally horizontal run of the transfer conveyor 22. The uphill characteristic of the conveyor 18 not only accommodates the distributor 14 in the space between the conveyors but also facilitates the transfer of centers at 36 without inverting the centers and yet keeps the centers approximately horizontal so that they do not lose their shape.

The second distributor is below the conveyor 22 and has an outlet 52 through which a second type of nuts, say, pecans, is discharged onto the upper run of the second conveyor 20 in layer fashion as at 54. Hence, the centers, having now accumulated nuts from the first layer 44 and being partly formed confections 34a, move over the transfer belt 22 and off of the end thereof, at 56, to drop onto the nut-carrying conveyor 20. Because of the tendency of the centers to adhere to the belt 22 as it passes around the roller 58, the centers are inverted or turned upside down so as to present their tops to the layer of nuts 54. Thus, a coating of nuts is applied to both top and bottom of the centers. As indicated, the distributors 14 and 16 may handle nuts of different types, or both may handle the same kind. When laden with nuts at both tops and bottoms, the confections reach a still further stage of completion, as at 34b, as they pass over the final carrier or conveyor to a tunnel conveyor 60 in the tunnel 30, wherein a final coating of chocolate is applied in any suitable fashion not material here.

Power for driving the several components of the apparatus may be suitably derived from an electric motor 62, for example, via drive chains or belts of any appropriate type, the nature of which is thought to be evident without detailed identification, except to note the driving connections at 64 between the conveyors 18 and 22; at 66 between the conveyors 18 and 32; at 68 between the conveyors 20 and 26; and at 70 between the conveyors 26 and 24.

The discharge end of the conveyor is in close proximity to the receiving end of the next conveyor 26 and any nuts 54 dropping through the gap, as shown by the arrow 72, fall into a second retrieving means or hopper 74 for return by an elevator or return means 76 to the distributor 16. Mixed nuts 42 and 54 that are apt to drop through the gap at the junction of the conveyors 26 and 60 fall, as shown by the arrow 78, into a basket or other suitable receptacle 80. A short drive chain 82 connects the two conveyors 26 and 60.

From the description thus far, it will be seen that the centers 34, emerging from the enrober 28, pass through the stages 34a and 34b and enter the tunnel 30 via 26 and 60. The stage 34b is achieved because of the transfer at the inverting zone afforded by the relationship between the conveyor roller 58 and the second nut-carrying conveyor 20, which phase of the apparatus is utilized to apply nuts or additive materials of the same or different types to both tops and bottoms of the tacky centers. However, the stage 34b may be omitted by positioning the by-pass conveyor as shown in dotted lines, in which position it is retained because its frame 82 rests on a pin or other support 84. Hence, the confections 34a will pass directly to the by-pass conveyor at 58 and will remain bottoms down instead of inverting; and the tops thereof will be nut-free, for final treatment in that fashion or in any other manner in which the addition of the nuts 54 is not required, it being noted that the by-pass conveyor pivots at 86 at its lower end in such manner as to remain proximate to the conveyor 26 and without disturbing the drive connection 70 regardless of its position.

When it is desired to eliminate the by-pass function, the by-pass conveyor can be swung to its full-line or raised position and retained thereat by any suitable means, such as a releasable lock at 88.

Although the apparatus disclosed is extremely simple in design, it is efficient and easily operated and maintained. The products thereof are uniform in quality and size and in the relative amounts of centers and additive materials. The by-pass feature affords flexibility and selectivity and enables change-over from one type of confection to another with a minimum of effort. Other features not specifically enumerated will occur to those versed in the art, as will modifications in the embodiment disclosed, all of which may be readily achieved without departure from the spirit and scope of the invention.

What is claimed is:

Apparatus for the manufacture of confections of the type having tacky centers to which additive materials are caused to adhere, comprising: a first distributor adapted to contain a first supply of additive material and having an outlet; a first conveyor movable past said outlet to receive thereon from said outlet a layer of the first additive material, said conveyor being movable to a transfer zone beyond said outlet; center-conveying means supporting tacky centers thereon, bottoms down, and operative to move the centers, still bottoms down, onto the aforesaid layer at a point beyond said outlet and short of the transfer zone so that the centers rest on and adhere to at least part of the material in said layers; a second distributor spaced from the transfer zone and adapted to contain a second supply of additive material, said second distributor having an outlet; a second conveyor movable past the second distributor outlet to receive additive material therefrom in layer fashion, said second conveyor being movable to a discharge end beyond said transfer zone; receiving means at and for receiving centers from said discharge end; transfer means at the transfer zone for moving centers from the first conveyor to the second conveyor and operative to turn the centers to present new tacky portions to the second layer to rest in and cause at least part of the additive material in said second layer to adhere thereto; and a by-pass conveyor having one end adjacent to and spaced above the receiving means and extending back toward the transfer zone in a retracted position, said by-pass conveyor in said retracted position having a second end spaced from the transfer zone to enable transfer of the centers from the first conveyor to the second conveyor and thence below said one end of said by-pass conveyor to the receiving means, said by-pass conveyor being movable to and operative in a by-pass position retaining its said one end adjacent to the receiving means and having its second end immediately adjacent the transfer zone so as to extend from the transfer zone to the receiving means for by-passing the transfer means and second conveyor so as to effect delivery of the centers to the receiving means free from the second additive material.

References Cited in the file of this patent

UNITED STATES PATENTS

| | | |
|---|---|---|
| 1,331,784 | Bird | Nov. 11, 1919 |
| 1,959,662 | Ellis | May 22, 1934 |
| 2,300,396 | Bookidis | Nov. 3, 1942 |
| 2,335,118 | Hanser et al. | Nov. 23, 1943 |
| 2,391,691 | Engels | Dec. 25, 1945 |
| 2,522,847 | Stiles | Sept. 19, 1950 |
| 2,551,849 | Petorilli | May 8, 1951 |
| 2,590,051 | Spain | Mar. 18, 1952 |
| 2,599,937 | Petorilli | June 10, 1952 |
| 2,659,338 | Harrison | Nov. 17, 1953 |
| 2,731,942 | Anderson | Jan. 24, 1956 |